United States Patent [19]

Murphy

[11] Patent Number: 5,234,580
[45] Date of Patent: Aug. 10, 1993

[54] DECANTING APPARATUS WITH FLOAT SUPPORTED SUBMERGED PUMP

[76] Inventor: D. Thomas Murphy, 584 Mililani Dr., Kihei, Hi. 96753

[21] Appl. No.: 850,113

[22] Filed: Feb. 19, 1992

Related U.S. Application Data

[62] Division of Ser. No. 753,860, Sep. 3, 1991.

[51] Int. Cl.$^5$ ............................................. B01D 35/05
[52] U.S. Cl. ..................................... 210/122; 137/395; 137/398; 210/123; 210/136; 210/242.1; 210/340; 417/61
[58] Field of Search ............... 210/136, 104, 121, 122, 210/258, 259, 242.1, 242.3, 525, 532.1, 538, 540, 123, 236, 237, 340; 137/395, 398; 417/41, 61

[56] References Cited

U.S. PATENT DOCUMENTS

| | | | |
|---|---|---|---|
| 3,547,553 | 12/1970 | Stanfield | 417/61 |
| 4,230,578 | 10/1980 | Culp et al. | 210/104 |
| 4,601,833 | 7/1986 | Shubert | 210/242.1 |
| 4,695,376 | 9/1987 | Astrom et al. | 210/242.1 |
| 4,711,716 | 12/1987 | Calltharp et al. | 210/525 |
| 5,036,882 | 8/1991 | Norcross | 210/136 |
| 5,104,528 | 4/1992 | Christie | 210/122 |
| 5,106,494 | 4/1992 | Norcross | 210/123 |

FOREIGN PATENT DOCUMENTS 64-75744 3/1989 Japan ................. 210/242.1

Primary Examiner—Joseph W. Drodge

[57] ABSTRACT

A decanting apparatus for a waste water treatment reactor which includes a float system which may be independent of the decanting apparatus end which allows the decanting apparatus to be removed without removing the float system. The decanting apparatus is a unique ball-funnel-shaped sleeve combination which may be powered internally or externally for removal of effluent that allows decanting below the surface at the most optimum level and may be intermittently operated on demand by floating switches or a programable timer. The decanting apparatus may be utilized in various applications including a gravity flow situation and two or more of these decanting apparatus's may be combined to provide more volume of effluent if required. This decanter is also ideal for environments where lower temperature extremes may form ice upon the upper layer of the fluid within the reactor.

20 Claims, 5 Drawing Sheets

DECANTING APPARATUS WITH FLOAT SUPPORTED SUBMERGED PUMP

CROSS REFERENCE TO RELATED APPLICATION

The present invention is a division of Ser. No. 07/753,860, filed Sep. 3, 1991 by the same inventor and is incorporated herein by reference.

FIELD OF THE INVENTION

This invention relates to wastewater treatment systems and more particularly to the decanting apparatus associated with such systems.

BACKGROUND OF THE INVENTION

The present invention relates to decanter systems and in particular, to decanter systems for utilization with wastewater treatment reactors.

Certain wastewater treatment processes, especially those utilizing sequential batch reactor techniques or processes, require that clarified fluid be periodically withdrawn from the reactor or digester within which the process is occurring. Such decanters must be functional throughout the year, even in environments where the lower temperature extremes may form ice upon the upper layer of the fluid within the reactor. It is also important that the decanting system not entrain sludge during mix cycles within the reactor or have sludge settle within the decanting system such that when clarified liquid is withdrawn, a certain amount of sludge is withdrawn with the liquid, as such entrainment would discharge highly polluted effluent.

One of the major problems with previous decanter systems for use in batch reactors has been that a receiver for the decanter has had the interior thereof open to the fluid within the reactor during sludge mixing cycles. When the sludge is being mixed with the incoming effluent and the entire reactor is in a generally mixed state, sludge is near the top of the reactor as well as the bottom. If the receiver is open at this time, the sludge usually enters the receiver and settles therein during settling cycles.

Thereafter, when the clarified fluid is withdrawn through the receiver, the sludge that is within the receiver is entrained with the clarified fluid to pollute the effluent. One solution to this problem is to withdraw the clarified fluid with a pump and have a cycle at the beginning of the withdrawal of the clarified fluid in which a certain amount of this fluid is directed back to the reactor so as to return the entrained sludge. Such a solution requires a pump and control mechanism or the like and close control of the recycle of the clarified fluid to the reactor.

Other attempts to resolve the problem of the sludge settling within the receiver, have been directed to physically removing the receiver from the tank during mixing cycles. This typically requires a cumbersome and expensive structure which is suitably strong to hold a decanting system out of the reactor fluid during the mix cycle. In addition, where freezing is likely to occur, fluid within the decanting structure may freeze if raised from the liquid in the reactor or, the fluid level at the top of the reactor may freeze which may make it difficult or impossible to raise and lower the decanting structure and to raise or lower a decanter requires a mechanical mechanism that is affected by weather conditions and requires regular maintenance.

Other problems associated with the decanting structure are that the receiver should be sufficiently spaced from the sludge layer to prevent accidental intake of sludge into the receiver. In addition, the receiver should withdraw clarified fluid in such a manner that the withdrawn fluid does not entrain sludge due to high velocities of the withdrawn fluid coming from or near the sludge layer or because the withdrawn fluid is taken from directly above the sludge layer.

Also the support structure for the decanter system must allow for vertical movement of the receiver, as the upper liquid level in the reactor may vary substantially during the different cycles therein. Preferably, the support structure allows the receiver to be supported at a generally fixed height beneath the upper liquid level so as to prevent entrainment of floating debris or scum into the receiver and articulated sufficiently so that the receiver may move freely and smoothly vertically while the upper liquid level is varying.

Certain other devices are designed to draw clarified fluid from near the bottom of the reactor so that a siphon can control flow. This draws from precisely the region of heavy sludge which should be avoided and should be drawn from the most clarified supernatant which is just below the liquid surface.

It is also noted that certain prior art decanting systems have incorporated extensive and expensive mechanical devices for manipulating the fluid receiver, sometimes into and out of the liquid layer within the reactor. The complex mechanical devices required for this operation are subject to failure and do not provide a simple and easy method of preventing sludge entry into the receiver. These devices often do not function well, if at all, where ice is floating on or forming upon the upper layer of the reactor and they require very level weirs so as to receive the liquid affluent evenly. These types of decanters in practice have proven to have problems maintaining a level weir, especially in the larger sizes.

Some of these problems have been addressed such as by U.S. Pat. No. 4,711,716 which discloses a floating decanter which includes flaps, nozzles, multiple ports, cover plate, etc. which teaches the float devices as intricate parts of the decanter and the decanter elements cannot be removed from a manway without removing the entire assembly including the floats.

The present invention addresses the above problems and teaches means to provide a simple floating decanter that is removable from above, i.e. the manway, leaving the floating device in the tank.

OBJECTS OF THE INVENTION

It is therefore, a primary object of the present invention to provide a floating decanter which can be removed from above and is separable from its floatation device.

Another object is to provide a decanting apparatus for use in conjunction with a wastewater treatment facility which is highly effective in preventing sludge and prevents mixed liquor from entering into the receiver during aeration or mixing cycles.

Still another object is to provide a decanting apparatus which is adaptable for use in different climates, wherein ice may form on top of the liquid level in the reactor.

Yet another object is to provide a decanting apparatus which prevents floating surface scum and debris from being withdrawn with the clarified effluent from the reactor.

Another important object is to provide a decanting apparatus which is articulated with respect to the reactor and freely moves vertically to compensate for change in the liquid level within the reactor.

Still another important object is to provide in the preferred embodiment means to keep the decanting apparatus at a specified location horizontally within the vessel to take advantage of the most optimum place to remove clarified affluent.

Yet another object is to provide a decanter that will load uniformly and is self leveling with the water level so as to prevent high flow velocities from occurring at one section of a large version decanter.

Still another object is to provide a decanter which will draw uniformly 360 degrees in an even flow pattern to each of the receivers.

Yet another object is to provide a high head multistage turbine for effluent discharge application requiring in excess of 100 lbs. of pressure to transport the effluent to its point of discharge.

Another important object is to provide a check valve receiver mechanism that is not of a material proved to require periodic replacement.

Other objects and advantages will become apparent when taken into consideration with the following drawings and specifications.

DETAILED DESCRIPTION OF THE DRAWINGS

Figure 1:
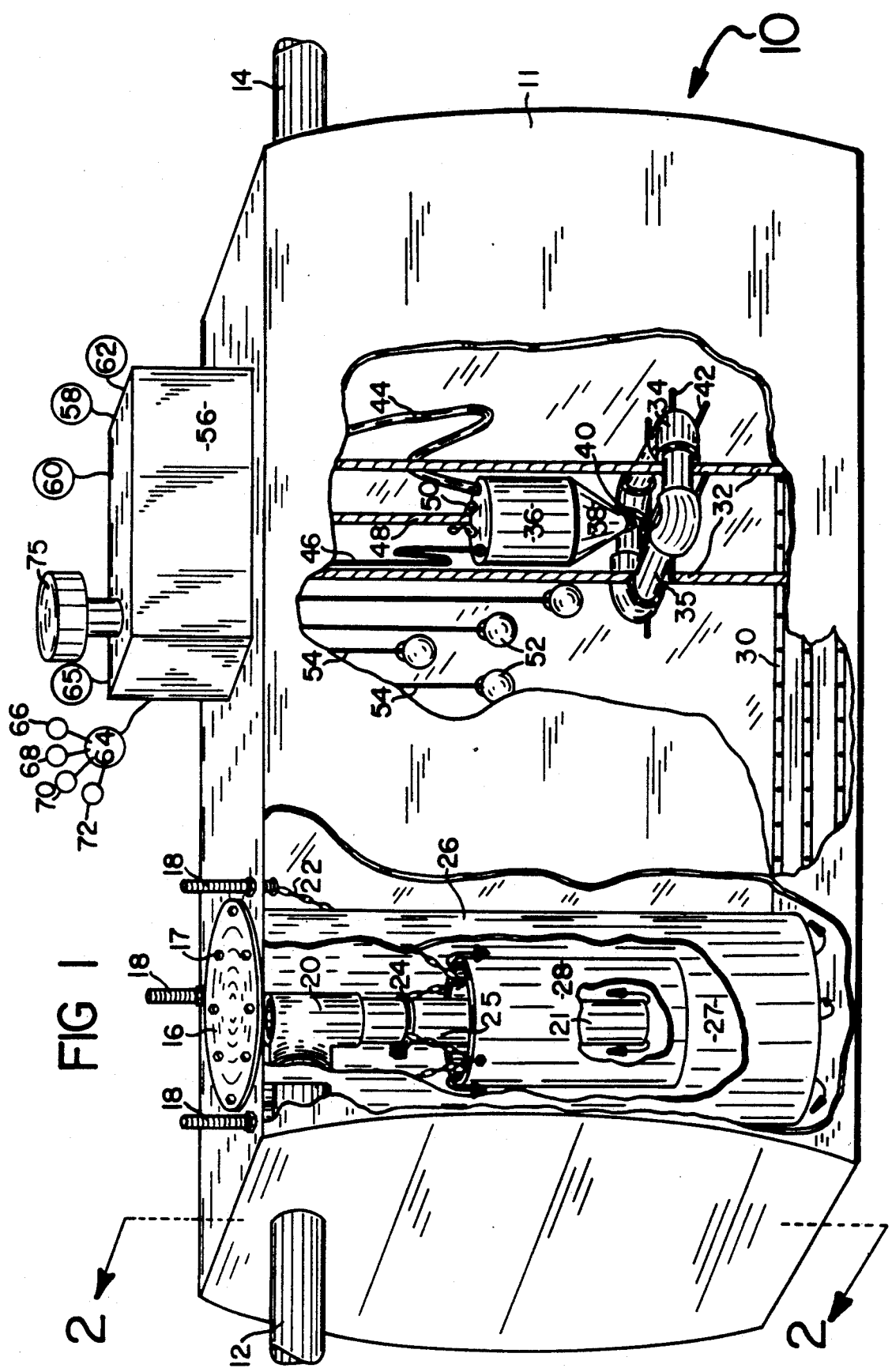
FIG. 1 is a partially cut-away perspective view showing the full disclosure of a wastewater treatment process a disclosed in the parent application Ser. No. 07/753,860 of the present invention and also showing the preferred embodiment of the present decanting apparatus.
Figure 2:
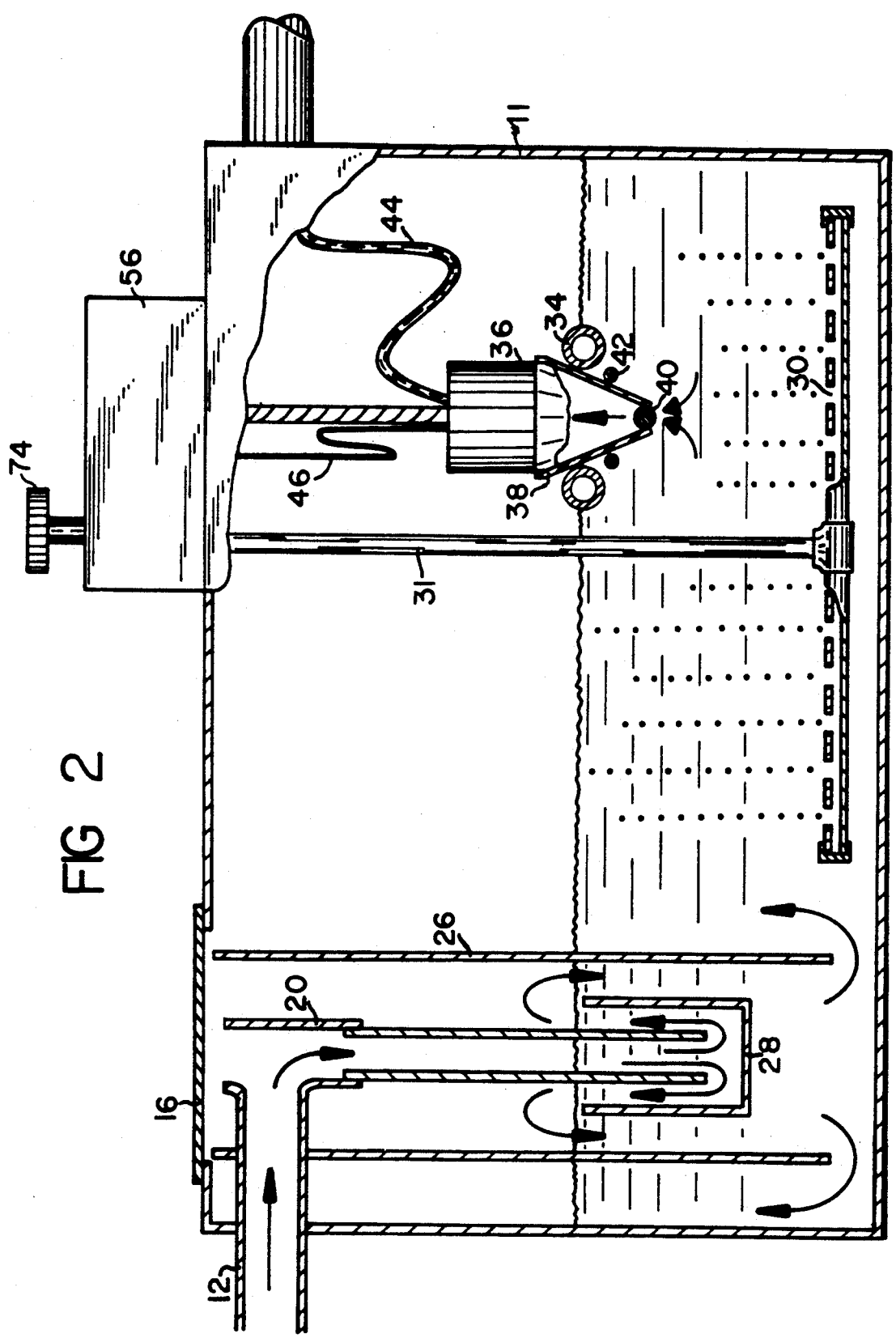
FIG. 2 is substantially a section taken at 2—2 of FIG. 1.

Referring now is detail to the drawings wherein like characters refer to like elements througout the various drawings, 10 is a general overview of the invention with 11 being a basin or tank made of a material such as fiberglass with its length being substantially longer than its width or height while 12 is an influent delivery system such as a pipe to deliver influent through pipe tee 20 and pipe section 21 into substantially the bottom section of chamber or collector 28. Collector 28 is adjustable in relation to section 21 by guide ring 24 and suspension chains 25 with 26 being a circular partition adjustably suspended above the floor of basin 11 by chains 22 and adjustable mounting bolts 18 with 16 being an access cover and being secured by fasteners 17. Circular partition 26, being larger in circumference than the collector 28, creates a pre-stratification zone 27 while 30 are multiple air diffusers connected to drop pipe 31 with the upper end of drop pipe 31 being suitably connected (not shown) to air compressor 58 which is mounted within the manway 56.

32 are ropes or guide lines suitably anchored to the bottom of the basin (not shown) with their upper ends terminating within the manway, (not shown) and act as guides and locating means for the floating decanter base section 35 and elbows 34, with 36 being a submersible motor and suction pump with 38 being a funnel shaped sleeve made of a suitable material such as rubber with its large open end cooperating with motor and suction pump 36 to provide a seal and its lower smaller end having a smaller opening cooperating with a ball 40 which acts a check valve. 42 is a mounting frame made of plastic pipe or other non-corrosive material with 4-way tees 78 being suitably bonded to sections forming a framework substantially in the shape of crossing railroad tracks with 75 being an above ground manway cover air-vent. Frame 42 is secure to pipe frame 35 by means such as screws 74, through screw holes 76 with screws 74 being suitably sealed into pipe frame 35 to allow frame 35 to be water tight.

44 is a flexible hose suitably connected to the output of motor and pump 36, with 46 being a submersible power cable and 48 being a rope or cable suitably attached to handle 50 of motor and pump 36. The flexible hose 44 is also suitably connected at its distal end (not shown) to the effluent output pipe 14, and the distal end of rope or cable 48 terminating inside the manway 56, (not shown).

52 are multiple floats housing suitable switches, such as mercury switches 66. 70 and 72 respectively, with the floats 52 being adjustably suspended (not shown) from inside the manway 56 by ropes or power cables 54. 60 is a programmable timer suitably mounted on control panel 65 with 62 being a junction box and 64 being a relay junction box.

Figure 3:
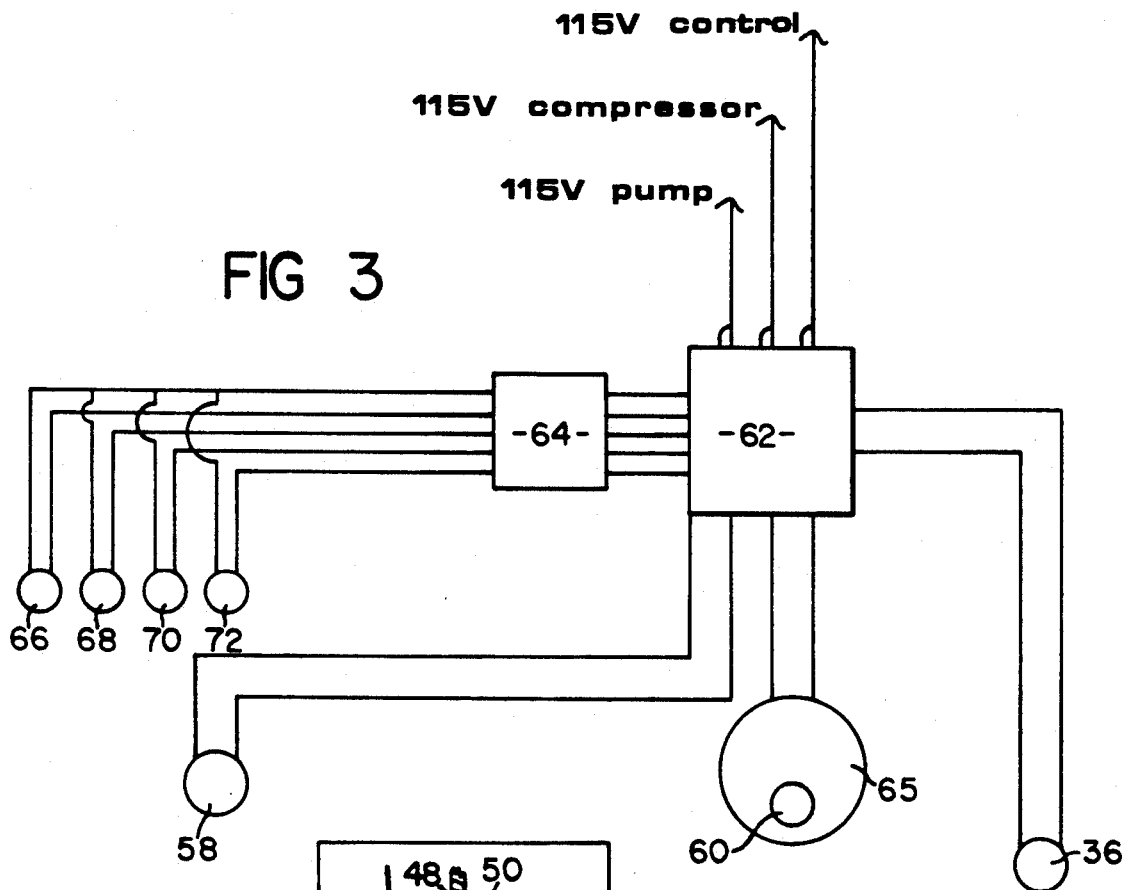
FIG. 3 is a general schematic of the system.
Figure 4:
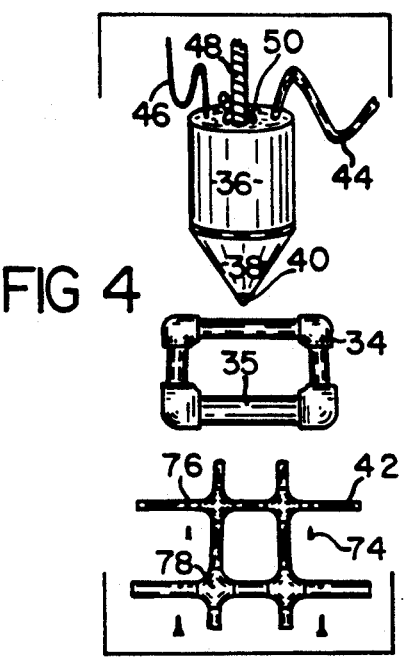
FIG. 4 is an exploded perspective view of the preferred embodiment of the decanter.
Figure 5:
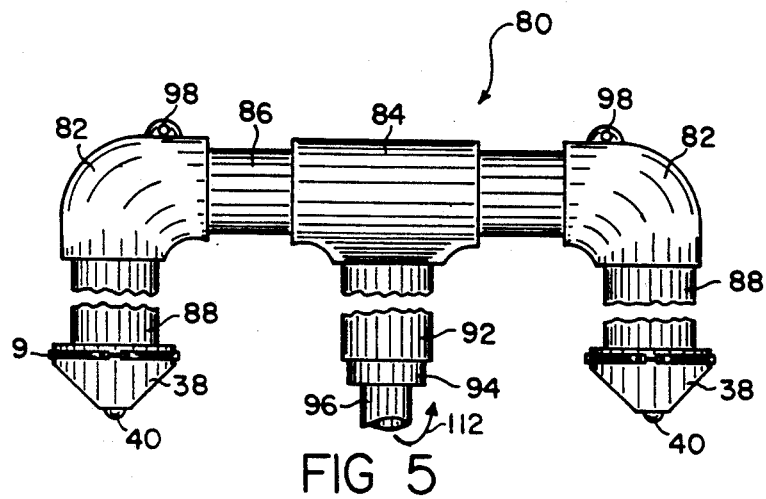
FIG. 5 is a side view in elevation of a manifold of a second embodiment showing dual inputs and a down draft siphon or pump connection.
Figure 7:
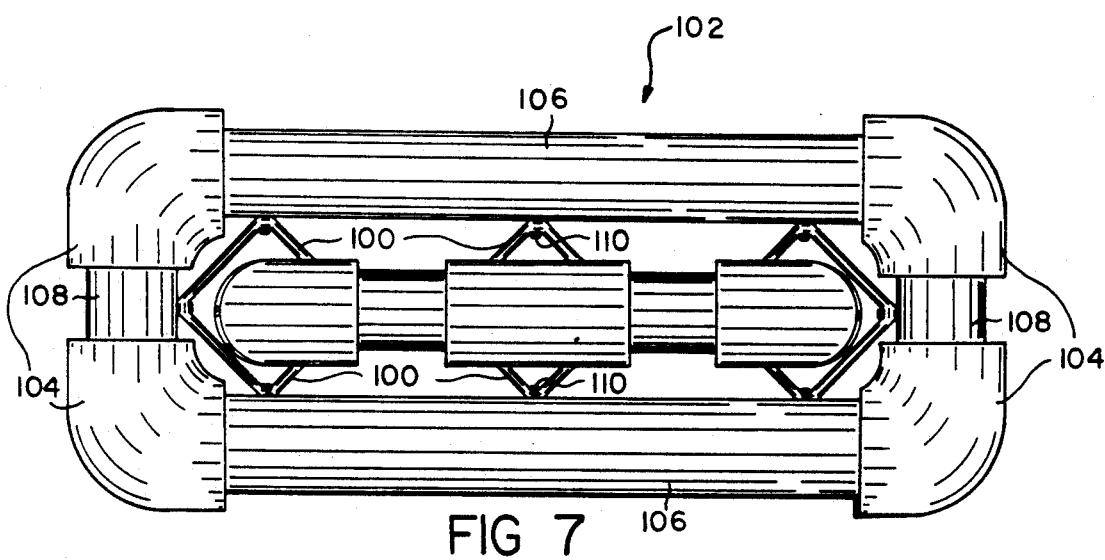
FIG. 7 is a top view of the floatation device of FIG. 7 with the manifold of FIG. 5 in place.
Figure 6:
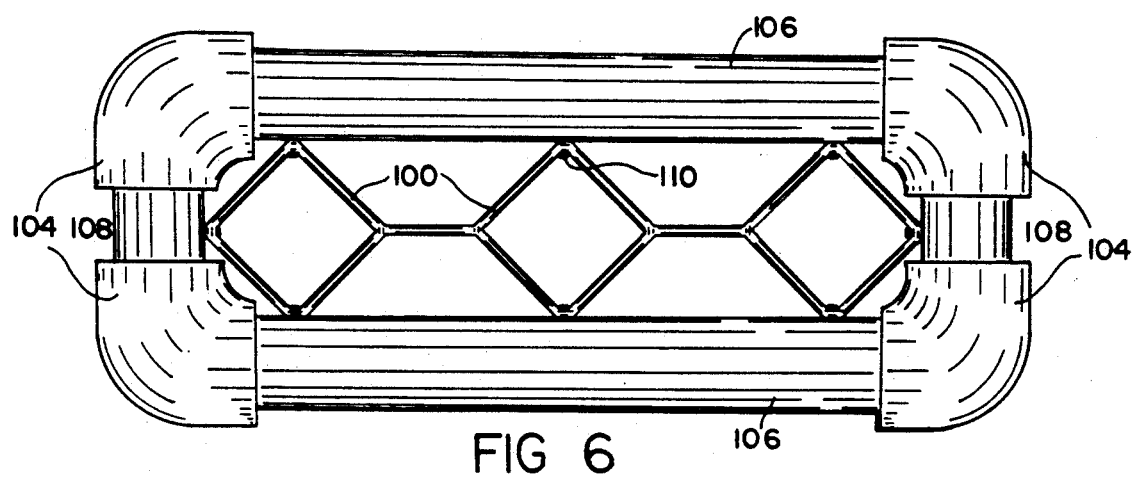
FIG. 6 is a top view of a floatation device and support frame for the second embodiment.
Figure 9:
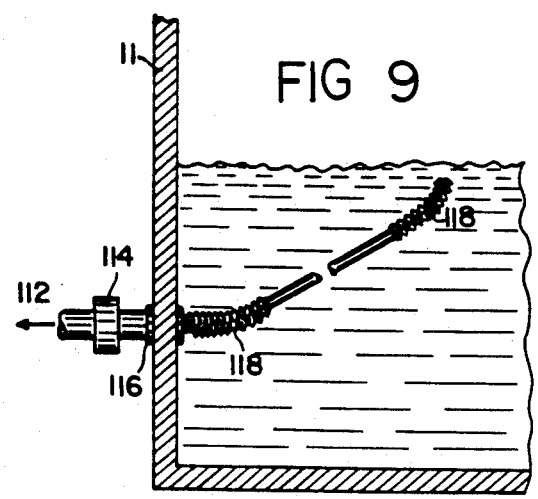
FIG. 9 is a partially cut-a-way plan view of a second embodiment of a discharge system.

Shown in FIG. 5 is a second embodiment with a manifold 80 which may be made of large plastic pipe fittings such as elbows 82, tee 84, and pipe sections 88, with screen 89, and supports the funnel shaped sleeve 38 on its downward facing pipe sections 88 which are suitably affixed to pipe sections 88 by means such as clamps 90. Pipe section 92 is suitably affixed to reducer 94 which in turn is suitably affixed to pipe section 96 which is suitably affixed to an output pipe indicated by 112 (which also shows by an arrow the direction of flow) and which may be flexible. The manifold section is also attached to removable means which may be ropes 48 or cables, at tie points 98 with the complete manifold, when in place, being supported by framework 100 as shown in FIG. 6 and 7 which is suitably affixed to floatation device 102 such as by screws 110 which may be made of large plastic pipe such as elbows 104 and pipe sections 106 and 108, respectively with the floatation device being made water tight or filled with plastic foam to make it buoyant. In this embodiment the clarified effluent as shown by arrow 112 is pumped by an exterior pump and motor (not shown) with a solenoid valve 114 suitably in phase with the control circuit as depicted in FIG. 3. This second embodiment may also be attached to a siphon system as shown in FIG. 9 with 116 being a through the wall water tight fitting with 118 being flexible hoses and a center section being a plastic pipe section 120.

Figure 8:
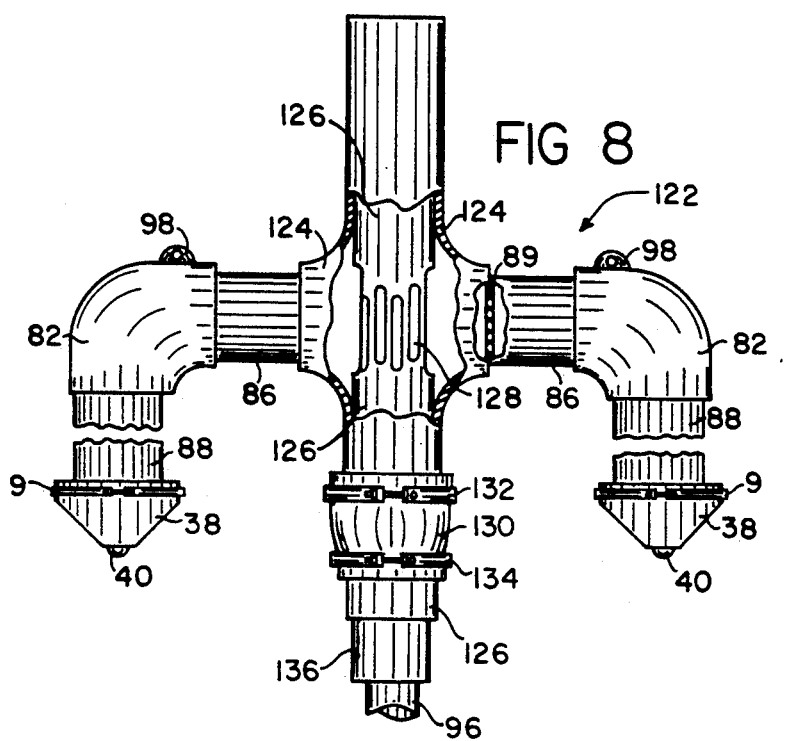
FIG. 8 is a partially cut-a-way side view in elevation of a third embodiment showing dual inputs in a manifold also housing an inverted submersible pump.
Figure 10:
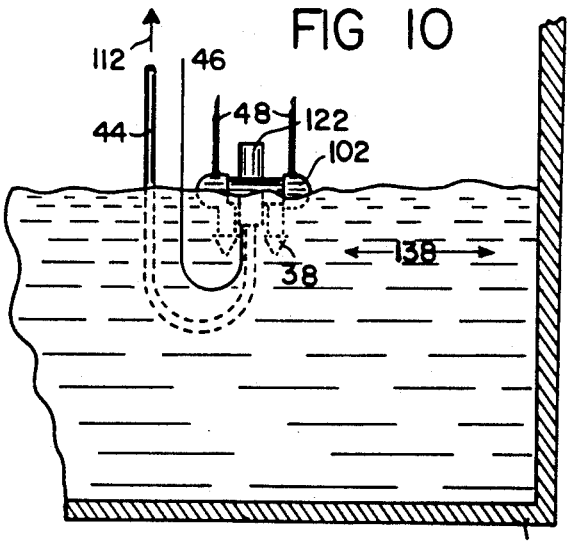
FIG. 10 is a partially cut-a-way plan view of the embodiment of FIG. 8.

In FIG. 8 is shown a third embodiment which is supported by the same floatation device of FIG. 6 and 7 with its manifold 122 having a 4-way tee section 124 which houses an inverted submersible pump 126 having its own motor drive (not shown) with input slots 128. The submersible pump 126 of known prior art is attached and supported to the bottom leg of the tee 124 by a boot or flexible connection 130 which is held in place on the tee 124 and the submersible pump 126 by clamps 132 and 134 respectively, with 136 being a suitably affixed check valve suitably affixed to output pipe section 96 of FIG. 8 and 44 as shown in FIG. 10. Arrows 138 indicate the strata area from which the decanting system removes the clarified effluent.

FIG. 10 shows the third embodiment in place in tank 11 with floatation device 102 supporting the submersible pump 126 with its manifold (not shown in this view) being affixed to ropes 48, with power cord 46 and output pipe 44 in place.

It will now be seen that the present invention, with its parent application 07/753,860, filed Sep. 3, 1991 owned by the same inventor, being incorporated in its entirety by reference, discloses a new and unusual decanting system that is supported by a floatation means which can move vertically with the rise and fall of the water level but is held horizontally in a specified and optimum location within the tank by guide means such as vertical ropes or cables and may be used in a variety of different situations by its versatility and varied embodiments and which allows the working parts with its manifold to be removed separately from its floatation device through the manway if servicing is required. Also the unusual design of the funnel and ball arrangement makes a simple and uncomplicated means of removing the clarified effluent when activated and keeping out solids during other cyclic activities.

The embodiments taught in this disclosure may be used in typical applications which require mandatory effluent discharge considerations involved with a wastewater treatment process or system and is adaptable to varied conditions ranging from being able to gravity flow out of an above ground basin, to having to be transported to a point of discharge a considerable distance away, or to a higher elevation.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by letters patent is:

1. A decanter apparatus comprising; A funnel shaped sleeve having first and second open ends, said first end being larger in circumference than said second end, a submersible motor, a suction pump having an exterior housing, connecting means connecting said motor to said pump, a ball, said funnel shaped sleeve forming a housing for said ball, said ball being larger in circumference than the circumference of said second end of said funnel shaped sleeve, said ball being smaller in circumference than the circumference of said first end of said funnel shape sleeve, said ball being arranged to travel between first and second position within said funnel shaped sleeve, said first position being closed not allowing effluent to pass through said funnel shaped sleeve, said second position being open allowing said effluent to pass through said funnel shaped sleeve, means to connect said first end of said funnel shaped sleeve to said pump housing, a flexible power cable, said power cable being connected to said submersible motor and a power supply, a discharge hose, said hose being in communication with said pump, a float means, said float means being of a size and shape and arranged so as to buoyantly support at least one of said funnel shaped sleeve and said pump housing in a body of liquid, whereby, when said motor is energized through said power cable, said suction pump is activated to draw a portion of said body of liquid through said funnel, lifting said ball to its said second open position and discharging said liquid through said discharge hose and when said motor is de-energized, said ball returns to its said first position.

2. The device of claim 1 including a framework substantially in the shape of crossing railroad tracks in which the center of said framework is substantially a square, said square being less in length on each of its four sides than a diameter taken substantially across a center portion of said funnel shaped sleeve and means to attach said framework to said float means whereby, when said framework is attached to said float means, said framework becomes a mounting support for said decanter apparatus.

3. The device of claim 1 in which said float means is made from hollow pipe suitably joined together to form a substantially buoyant square, said square being larger on its interior than the largest diameter of said motor, said pump and said funnel shaped sleeve.

4. The device of claim 1 in which said submersible motor and said suction pump are in one unit.

5. The device of claim 1 in which said funnel shaped sleeve is made of rubber.

6. The device of claim 5 in which said rubber shaped sleeve is smaller at its larger first end than said exterior housing of said suction pump and when said first end of said funnel shaped sleeve is forced over said housing of said suction pump and said sleeve is held in a fixed relationship with said exterior housing by friction.

7. The device of claim 1 including means to raise and lower said motor, said suction pump and said funnel shaped sleeve, into and out of said float means.

8. The device of claim 7 in which said means to raise and lower said motor, said suction pump and said funnel shaped sleeve is a rope, said rope having attaching means on one of its ends to attach said rope to said motor.

9. The device of claim 1 in which said framework has guidance means which will allow vertical movement of said decanter and keep said framework in a fixed vertical plane.

10. The device of claim 9 in which said guidance means is at least two ropes suitably attached at their distal ends to the bottom and top of a tank associated with said liquid forming a vertical plane, said ropes having slidable connecting means to said framework to allow vertical movement of said float and said decanting apparatus.

11. A decanter apparatus comprising; at least two funnel shaped sleeves having first and second open ends, said first ends being larger in circumference than said second ends, at least two balls, said funnel shaped sleeves forming a housing for said balls, said balls being larger in circumference than the circumference of said second end of said funnel shaped sleeves, said balls being smaller in circumference than the circumference of said first end of said funnel shaped sleeves, said balls being arranged to travel between first and second positions within said funnel shaped sleeves, said first positions being closed not allowing effluent to pass through said funnel shaped sleeves, said second positions being open allowing said effluent to pass through said funnel shaped sleeves, a manifold, said manifold having at least three downward facing legs, one of said downward facing legs being a common leg of a tee, said tee having a cross member, said tee communicating with said two funnel shaped sleeves through said cross member of said tee, means to connect said first end of said funnel shaped sleeves to said downward facing legs of said manifold, a flexible hose, means to connect one end of said hose to said downward facing common leg of said tee, means to connect the distal end of said hose to an outside discharge system, a float means, said float means being of a size and shape and arranged so as to buoyantly support at least one of said funnel shaped sleeves and said manifold in a body of liquid, whereby, when said discharge system is activated said liquid is removed through said manifold and said funnel shaped sleeves by lifting said balls to their said second open position and when said discharge system is de-activated said balls return to their said first closed position.

12. The device of claim 11 in which said support means to buoyantly support said manifold are substantially multiple square frames cooperating with said multiple downward facing legs of said common leg of said tee, and attaching means to attach said frames to said float means.

13. The device of claim 11 in which said float means is made from hollow pipe suitably joined together to form a substantially buoyant rectangle, said rectangle being larger on its interior than said manifold.

14. The device of claim 11 in which said funnel shaped sleeves are made of rubber.

15. The device of claim 14 in which said rubber funnel shaped sleeves are smaller at their larger first ends than the exterior of said downward facing legs, whereby;

when said first ends of said funnel shaped sleeves are forced over said exteriors of said downward facing legs, said sleeves are held in a fixed relationship with said legs by friction.

16. The device of claim 11 including means to raise and lower said manifold into and out of said said float.

17. The device of claim 16 in which means to raise and lower said manifold into and out of said float are multiple ropes.

18. The device of claim 11 in which said tee is a four-way tee, an inverted submersible pump, said pump having its own motor drive, said pump and motor being enclosed and supported on the interior of said four-way tee, a check valve, said valve having input and output ends, means to attach said input end of said valve to said bottom common leg of said four-way tee, and means to attach said output end of said valve to said flexible hose.

19. The device of claim 18 in which said means to attach said input and said output ends of said valve to said bottom common leg of said four-way tee and said flexible hose is a rubber boot and means to clamp said boot to said four-way tee and said flexible hose.

20. The device of claim 11 including multiple screens, said screens being located between said sleeves and said tee.

* * * * *